Nov. 10, 1942.　　　　E. R. PRICE　　　　2,301,321
POWER BRAKE
Filed April 11, 1940　　　3 Sheets-Sheet 2

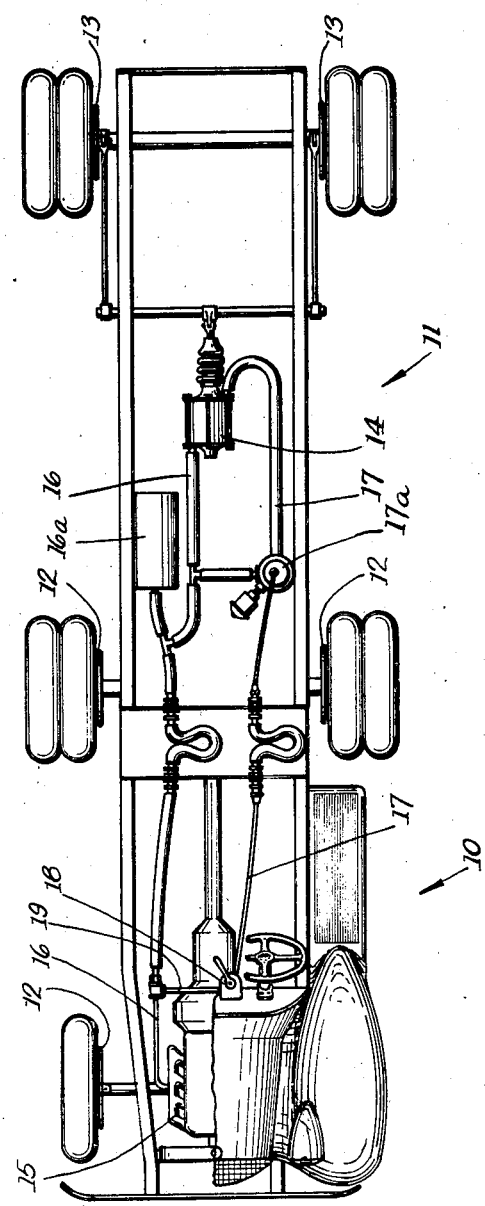

INVENTOR
EARL R. PRICE
BY
ATTORNEY

Nov. 10, 1942.  E. R. PRICE  2,301,321
POWER BRAKE
Filed April 11, 1940  3 Sheets-Sheet 3

INVENTOR
EARL R. PRICE
BY
*M. W. McConkey*
ATTORNEY

Patented Nov. 10, 1942

2,301,321

UNITED STATES PATENT OFFICE 2,301,321

POWER BRAKE

Earl R. Price, South Bend, Ind., assignor to Bendix Aviation Corporation, South Bend, Ind., a corporation of Delaware Application April 11, 1940, Serial No. 329,049

9 Claims. (Cl. 303—54)

This invention pertains to control valves and more particularly to valves for controlling power units which in turn perform some desired regulating function.

The occasion for the development of my invention has been the need for adequate hand control valves for trailer brakes. The hand control valves previously provided have had certain unsatisfactory features which I have attempted to remedy. Among these faults have been a lack of accurate graduation of power applied and a failure of the controlled motor to respond quickly and fully to manipulation of the control valve.

One object of my invention is to provide a novel hand control valve which can be readily assembled, and in which the operating parts may be adjusted during the assembling operation to provide an effective and reliable control unit.

A second object is to furnish a control valve so arranged that a relatively small force will be used on parts of the valve which have to be positioned accurately. This allows a delicate responsiveness in the valve structure which would otherwise be unattainable.

A third object is to provide a relatively large distance through which the operating parts of the valve may travel while the valve is being moved from the no-power position to the full power position. This means that the quantity of power applied through the controlled motor will be highly sensitive to the positioning of the valve's manual control.

A further object is to provide a manually controlled valve which regulates the controlled pressure in accordance with the position of the manual control, and does not cause a force proportional to the applied power to react against the manually applied portion of the valve. This makes control of the valve easy for the operator, and yet accurate.

A feature of my invention is that the reaction which increases as the applied power increases exerts its force against the casing of the valve.

Further features of my invention are the several adjustments provided for assembling the valve so that it will maintain itself in satisfactory working order.

Other objects and features of my invention will become apparent during the course of the following description. Reference in the description will be had to the accompanying drawings, in which:

Figure 1 shows my invention applied to a trailer power brake in a tractor-trailer vehicle combination;

Figure 3:
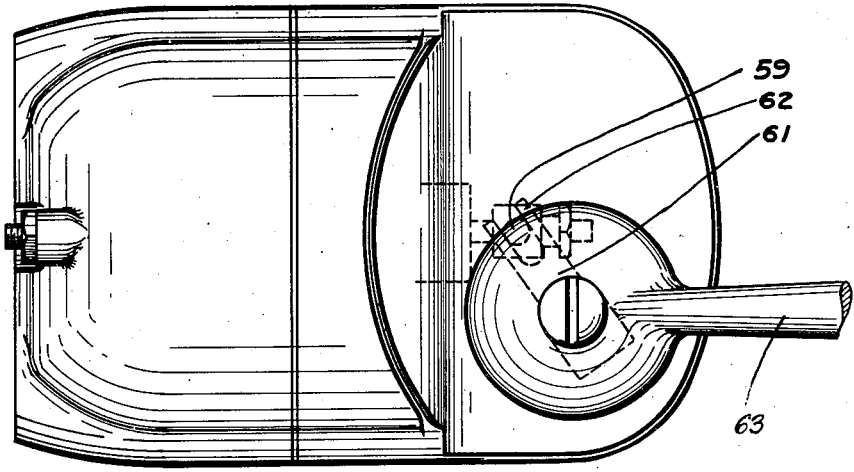
Figure 3 shows a plan view of the valve of Figure 2.

While the drawings and description of my invention illustrate it as used in a trailer brake, it will be appreciated that many other uses for it may be found. Any type of power brake requiring manual control or any power actuator used with fluid pressure may be operatively combined with my device.

Figure 1 shows a tractor vehicle 10 and a trailer vehicle 11 having respectively wheel brakes 12 and 13. The brakes 13 of the trailer are connected by suitable linkage to a power cylinder 14, which is adapted to at times apply the said trailer brakes.

I have chosen to show in Figure 1 a power cylinder of the vacuum suspended type, with, of course, the proper accompanying conduits and connections. An air-suspended power cylinder could equally well be used, as will be explained hereinafter.

The tractor vehicle 10 has a manifold 15 associated with the usual internal combustion engine. A conduit 16 connects the manifold, which is the usual source of vacuum power, to one side of the trailer power cylinder 14 and the other side of the power cylinder 14 is connected by a conduit 17 to a control valve 18 on the tractor, the said control valve being my novel manual control mechanism. Interposed in the conduit 17 is a relay valve 17a of the well known type. The relay valve 17a is used to speed up response of the trailer power cylinder to actuation of the control valve 18. For purposes of description the relay valve will be considered as merely a part of the control line 17. Also shown as a desirable but not necessary adjunct of my brake control system is a trailer vacuum reserve tank 16a, interposed in the vacuum line 16. A conduit 19, branching from the vacuum conduit 16, is connected to the control valve 18.

Figure 2:
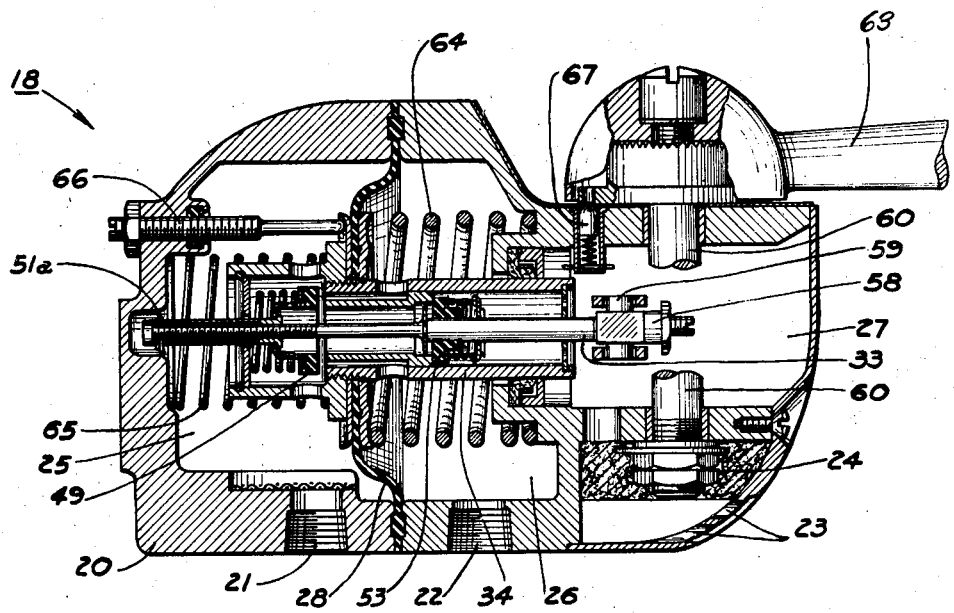
Figure 2 shows in vertical section my novel hand control valve.

It will be understood that manipulation of the control valve 18 is the method to be used by the operator of the tractor in controlling the trailer brakes. I, therefore, refer to Figures 2 to 4 for a detailed picture of the valve 18.

The control valve 18 is provided with a casing 20, the casing having three ports, 21, 22 and 23. Port 21 is connected to the control conduit 17; port 22 is connected to the vacuum conduit 19; and port 23 is at all times open to air at atmospheric pressure, the air entering the valve 18 through an air cleaner 24.

The valve 18 may conveniently be considered as being divided into three chambers, a control chamber 25, a vacuum chamber 26, and an air chamber 27. The control chamber 25 is separated from the other chambers by a diaphragm 28 which is secured by suitable means to the casing 20. The vacuum chamber 26 is sealed from the air chamber 27 by an annular flanged bushing 29 and an annular resilient seal 30. The bushing 29 is pressed into the casing 20 and the casing 20 is further provided with an interior flange 31 to hold the seal 30 in place. A metal ring 32 encircles the inner flattened portion of the seal 30 to perfect the sealing arrangement.

The chief operating elements of my valve are a control rod 33 and a cylindrical control element 34. The cylindrical control element 34 is fixed by suitable means to the diaphragm 28 and moves therewith. Annular metal washers 35 are placed on either side of the diaphragm 28 and the cylindrical control element 34 extends through central openings in the diaphragm 28 and the washers 35. At one end of the cylindrical control element 34 and placed in the interior of the element 34 is a metal plate 36 having a plurality of openings 37, said metal plate being locked in the control element 34 by a metal ring 38. A cylindrical element 39 of smaller diameter than the element 34 is placed inside the element 34 and an annular flange 40 on the said element 39 is pressed into the interior wall of the element 34 to make an air tight fit therewith. Vacuum ports 41 are provided in the walls of the cylindrical control element 34.

A cage 42 is secured to one end of the cylindrical control element 39. A metal ring 43 snapped into a groove in the interior of the cage 42 holds against movement in a leftward direction a metal plate 44. Openings 42a are provided in the sides of the cage 42. A spring 45 rests at one end on the metal plate 44 and at the other end on a flange 46 which extends outward from the base of a small metal housing 47. The housing 47 is provided with a plurality of openings 48. Pressed into the base 46 of the housing 47 is an annular resilient seal 49 which I will hereinafter term, for purposes of clarity, the "vacuum seal." It will be noted that the spring 45 is at all times exerting a pressure tending to move the seal 49 to closed position against the annular valve seat formed by the left ends of the elements 34 and 39. Movement of the seal 49 to closed position is at times prevented by the engagement of the top of the small metal housing 47 with a flange 50 on one end of an internally threaded adjusting element 51. The left end of the rod 33 is provided with a threaded portion 52, and the adjusting element 51 is screwed on the left end of the rod 33.

The cage 42, the cylindrical element 39 and the cylindrical element 34 all move as a single unit with the diaphragm 28, and it is through these members, as will hereinafter be explained, that the position sensitivity of the valve is created.

A resilient seal 53 which will hereinafter be termed the "atmospheric seal," is arranged to at times seal the interior of the cylindrical element 39 from the air in chamber 27. The atmospheric seal is yieldingly urged toward its seat on the flanged end 40 of the element 39 by a spring 54 which rests at one end against the atmospheric seal 53 and at the other end against an annular retaining element 55 which is prevented from movement to the right along the rod 33 by a locking ring 56 pressed into the rod. A metal ring 57 is secured to the rod 33 at a point left of the atmospheric seal 53 and is adapted upon movement of the rod to the right to lift the atmospheric seal from its seat.

The right end of the rod 33 is secured by an adjustable member 58 to a trunnion 59. A rod 60 extends from top to bottom of the casing 20 perpendicular to the axis of the rod 33. The rod 60 has secured thereto for rotation therewith control member 61. The control member 61 has a pair of projections 62 each of which is forked. The trunnion 59 is adapted to slide in the alleys created by the forks of the projections 62, the upper end of the trunnion sliding in the forks of one projection and the lower end of the trunnion sliding in the forks of the other projection. A hand lever 63 is geared by suitable means to the rod 60 so that movement of the hand lever will rotate the rod which in turn will change the position of the trunnion 59, moving the rod 33 to control the vacuum and atmospheric valves.

When the interior of my hand control valve is built, the internally threaded adjusting element 51 should be properly positioned on the left end of the rod 33 to assure that the housing 47 will hold the vacuum seal from its seat a certain distance, the proper distance depending upon the type of power cylinder that is to be controlled and upon the position of the atmospheric seal relative to its seat. Since, in this particular instance, I am illustrating a vacuum suspended power cylinder, the vacuum seal 49 should be held off its seat in released position of the valve and the vacuum seal should be arranged to move to its seat slightly before the ring 57 on the rod 33 moves the atmospheric seal away from its seat. This adjustment is accomplished by screwing the adjusting element 51 to its proper position on the end of rod 33 and then placing pin 51a through the adjusting element 51 and the end of the rod 33 to retain them in adjusted position.

It will be understood that, in released position, the vacuum valve is held off its seat against the pressure of the spring 45. This allows vacuum to enter through conduit 19, port 22, chamber 26, opening 41, thence through the annular opening formed between the exterior of the element 39 and the interior wall of the floating control element 34 and through openings 42a in the cage 42 into the control chamber 25. From there vacuum goes through port 21 and conduit 17 into the right end of power cylinder 14. Since the power cylinder 14 now has vacuum on both sides of the piston therein (not shown), the piston is submerged in vacuum and the trailer brakes are released.

Figure 4:
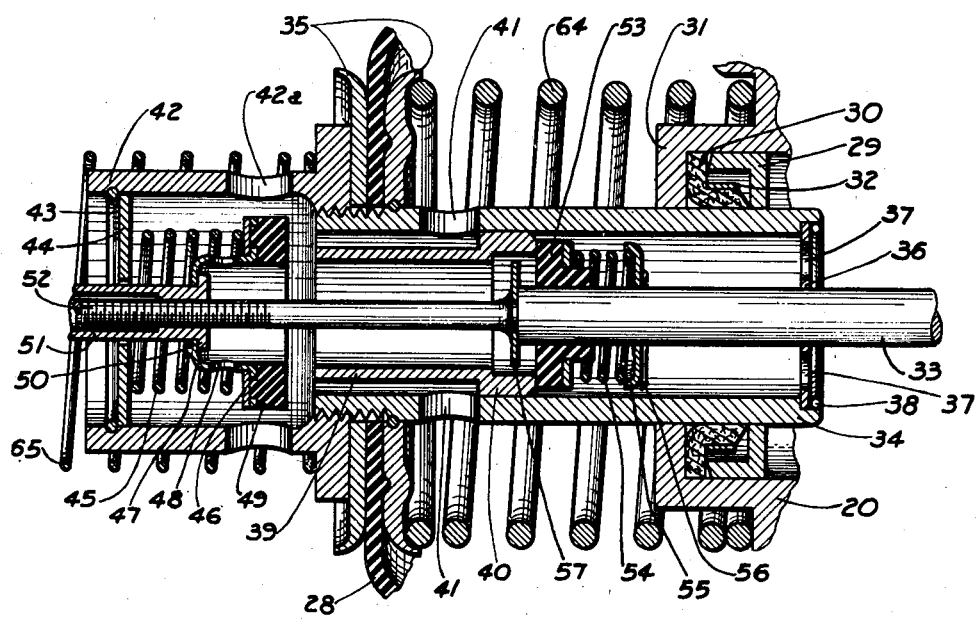
Figure 4 shows an enlarged sectional view of the chief operating parts of the valve of Figures 2 and 3.

In the released position of the brakes, the hand lever 63 is in the position shown in Figure 3. When the operator wishes to apply the trailer brakes, he moves the hand lever in a clockwise direction. This, it will be seen, forces the trunnion 59 to the right carrying with it the rod 33. As the rod 33 moves to the right, the flange 50 of the adjusting element 51 is moved out of engagement with the top of the housing 47 allowing spring 45 to close the vacuum seal 49. Shortly thereafter, the continued movement to the right of rod 33 causes the ring 57 to raise the atmospheric seal from its seat allowing air under atmospheric pressure to come through the port 23, air cleaner 24, chamber 27, the openings 37, the interior of the cylindrical control element 34, past the atmospheric seal, through the interior of the smaller cylinder 49, through the openings in the housing 47 and the openings in the cage 42 into the control chamber 25. The pressure thus introduced into the chamber 25 is transmitted to the right end of the cylinder 14 causing the piston therein to move to the left and apply the trailer brakes.

The method in which positioning of the hand lever 63 determines the amount of power to be used in applying the tractor brakes will now be described. As air enters the control chamber 25, a pressure will be built up tending to move the diaphragm 28 to the right against the vacuum which is maintained in chamber 26.

A heavy graduating spring 64 bears at one end against the diaphragm 28 and at the other end against the casing 20. A lighter spring 65 bears against the casing 20 at the left end thereof and bears at its other end against the base of the cage 42. Spring 64, therefore, urges diaphragm 28 toward the left, while spring 65 tends to urge diaphragm 28 toward the right. Movement of diaphragm 28 toward the right, due to the pressure of air in control chamber 25, is resisted by the graduating spring 64. As the diaphragm moves to the right, the increase in resistance of the spring to movement of the diaphragm is directly proportional to the distance traveled by the diaphragm.

As the diaphragm 28 moves to the right, it carries with it the cylindrical floating control element 34. Assuming that the rod 33 has remained substantially stationary after first being moved to apply the brakes, movement of the element 34 to the right under the control of diaphragm 28 will cause the atmospheric valve 53 to move to its seat under the influence of spring 54. The valve is now in lapped position and no further pressure will be admitted to the trailer power cylinder until the position of the hand lever 63 is changed. Since movement of diaphragm 28 is resisted by constantly increasing force due to the compression of spring 64, a higher pressure differential will be maintained over the diaphragm 28 as the hand lever 63 is moved to full brake applied position. Thus the amount of power applied to the tractor brakes is responsive to the position of the lever 63. Because of the relatively large distance through which the diaphragm 28 may be moved, my improved hand control valve is highly sensitive to the control of the operator. Further, it will be seen that the reaction of the valve to increased power is transmitted through the spring 64 to the casing 20 and is not transmitted to the operator. Thus the valve is not sluggish and hard to operate at high pressures.

In releasing the trailer brakes the hand lever 63 is moved in a counterclockwise direction causing the rod 33 to move to the left. This results first in closing the atmospheric seal 53 and shortly thereafter in opening the vacuum seal 49 allowing the air in chamber 25 and in the right end of power cylinder 14 to be withdrawn, releasing the trailer brakes.

The initial adjustment of my hand control valve is accomplished as follows. After the described parts have been placed in assembled relationship, a screw 66 is inserted through the left end of casing 20 and is extended sufficiently far into the interior of the valve to exert a slight compression against diaphragm 28 tending to move it to the right and creating slight compression on spring 64. This adjustment is necessary to hold the parts in proper position when the valve is released. After this adjustment has been made, it is customary to move the hand lever 63 to a position just beyond a detent or click mechanism 67. Then the adjustable member 58 on the right end of the rod 33 is adjusted so that with the hand lever 63 in the above described position the pressure differential over the diaphragm 28 is approximately four inches of mercury.

Figure 5:
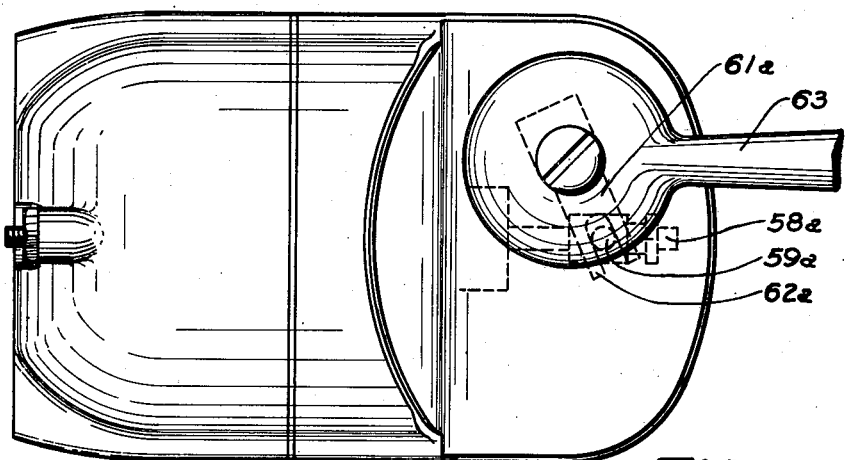
Figure 5 shows a plan view of a valve similar to that of Figures 2 and 3 but arranged to operate in conjunction with a different type of power brake.

Figure 5 illustrates the hand lever mechanism used when it is desired to use my invention in combination with an atmospheric suspended power cylinder. All the interior elements of the valve 18 are the same as those described and shown in the vacuum suspended system. The only change is made in the position of the hand lever and the elements directly associated therewith. As will be seen from Figure 5, the hand lever is moved in a clockwise direction to apply the brakes. This movement of the hand lever causes the rod 33 to move to the left closing the atmospheric seal and opening the vacuum seal. Thus the trailer power cylinder, which has up to now been submerged in air at atmospheric pressure, is now subjected on one side of its diaphragm or piston (not shown) to vacuum which enters from the control chamber of the valve 18.

It will be understood that, in the released position of the atmospheric suspended system, the diaphragm 28 is moved as far to the right as it will go against the compression of the spring 64. When the handle is adjusted in its first click or detent, the pressure differential over the diaphragm is, in an atmospheric suspended system, approximately 16 inches of mercury. As vacuum is admitted to the control chamber 25 to apply the trailer brakes, the pressure differential over the diaphragm 28 will decrease and allow diaphragm 28 to move under the pressure of spring 64 in a leftward direction. The diaphragm carries with it the cylindrical elements 34 and 39 and thus tends to close the vacuum seal 49 and bring the valve to lapped position. In releasing the atmospheric suspended brakes, the hand lever 63 is moved in a counterclockwise direction, pulling rod 33 to the right, thus moving the vacuum seal to its seat and opening the air seal allowing air to enter chamber 25. This entry of air into chamber 25 accomplishes two things: It releases the trailer brakes and at the same time moves the diaphragm 28 to the right, compressing spring 65.

While I have described only two embodiments of my invention, it will immediately be apparent to those skilled in the art that numerous other uses of my novel device may be made. I, therefore, do not intend to limit the scope of my invention to the embodiments described, or otherwise than by the terms of the appended claims.

I claim:

1. A control valve for differential air pressure power brakes comprising a control chamber, a chamber adjacent thereto, a diaphragm between the two chambers, a vacuuum conduit connected to the control chamber, an air conduit connected to the control chamber, a vacuum poppet seal, an air poppet seal, a rod for in part controlling the movements of said seals, means associated with the rod for urging one of the seals to open and the other of the seals to close its respective conduit to the control chamber, and a control element movable with the diaphragm, said control element having associated therewith the seats for said vacuum and air seals.

2. A valve for the control of a differential air pressure power motor comprising a casing, a control chamber, a low pressure chamber, a diaphragm therebetween, a cylindrical control element movable with said diaphragm, a control rod movable through the center of the said cylindrical control element, and a graduating spring in the low pressure chamber bearing at one end on the diaphragm and at the other end on the casing of the valve.

3. A valve for the control of a differential air pressure power motors comprising a casing, a control chamber, a low pressure chamber, a diaphragm therebetween, a control element secured to said diaphragm and providing a pair of valve seats, and a rod movable through said control element and having associated therewith a pair of valve elements.

4. A valve for the control of a differential air pressure power motors comprising a casing, a control chamber, a low pressure chamber, a diaphragm therebetween, a control element secured to said diaphragm and providing a pair of valve seats, a rod movable relative to said control element, a pair of valve elements at times contacting said valve seats, and means associated with the rod for positioning the valve elements.

5. A valve for the control of a differential air pressure power motors comprising a casing, a control chamber, a low pressure chamber, a diaphragm therebetween, a graduating spring in the low pressure chamber bearing at one end on the diaphragm and at the other end on the casing of the valve, and a rod in the control chamber adapted to slightly pre-load the spring to determine the released position of the diaphragm.

6. A valve for the control of a differential air pressure power motors comprising a casing, a diaphragm, a control chamber formed between the casing and the diaphragm, means for connecting the control chamber to air at atmospheric pressure, means for connecting the control chamber to a pressure less than atmospheric, and valve elements for controlling both of the aforesaid connecting means, said valve elements being of the poppet type and being so positioned as to be urged to close their respective connecting means by the differential pressures prevailing at the points where the valve elements may contact the connecting means.

7. A valve for the control of a differential air pressure power motors comprising a casing having a plurality of chambers therein one of which is a control chamber, a diaphragm forming a movable wall of the control chamber, a control element secured to the diaphragm and providing a pair of valve seats, a second control element movable relative to the first control element, means for at times connecting a greater pressure to the control chamber, means for at times connecting a lesser pressure to the control chamber, a pair of poppet valves one for controlling each of said connecting means, each of the poppet valves being normally urged to disconnect its respective connecting means from the control chamber by a differential of pressures over it.

8. A hand valve for the control of a differential air pressure power motors comprising poppet type valves for controlling the actuation of the said power motors, a manually controllable element for in part regulating the poppet valves, a diaphragm responsive to a pressure differential equal to that existing in the power motors, means for limiting the pressure differential over the diaphragm and in the power motors according to the position of the manually controllable element, and differential air pressure means normally urging the valves to closed position but having slight effect on the valves once opened, so that actuation of the power motors by the hand valve according to the movement of the manually controllable element may be determined by a series of sudden and positive openings and closing of the valves.

9. A valve for the control of a differential air pressure power motors comprising a casing having a plurality of chambers one of which is a control chamber, a diaphragm forming a movable wall for said control member, a control element secured to said diaghragm and providing a pair of valve seats, a pair of valve elements at times contacting said valve seats, a rod movable relative to said control element and adapted to in part position the valve elements, said valve elements being constructed and arranged to have sufficient flexibility so as to align themselves with the valve seats even in case of misalignment of the rod relative to the control element.

EARL R. PRICE.